United States Patent
Quinn et al.

(10) Patent No.: US 10,386,594 B2
(45) Date of Patent: Aug. 20, 2019

(54) TACTICAL DEPLOYABLE CABLES

(71) Applicant: AFL TELECOMMUNICATIONS LLC, Duncan, SC (US)

(72) Inventors: Justin Quinn, Boiling Springs, SC (US); Craig Stratton, Spartanburg, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/758,244

(22) PCT Filed: Sep. 9, 2016

(86) PCT No.: PCT/US2016/051000
§ 371 (c)(1),
(2) Date: Mar. 7, 2018

(87) PCT Pub. No.: WO2017/044783
PCT Pub. Date: Mar. 16, 2017

(65) Prior Publication Data
US 2018/0252884 A1    Sep. 6, 2018

Related U.S. Application Data

(60) Provisional application No. 62/217,400, filed on Sep. 11, 2015.

(51) Int. Cl.
*G02B 6/44* (2006.01)
(52) U.S. Cl.
CPC ........... *G02B 6/4432* (2013.01); *G02B 6/441* (2013.01); *G02B 6/4413* (2013.01); *G02B 6/4434* (2013.01); *G02B 6/4457* (2013.01)

(58) Field of Classification Search
CPC .......... G02B 6/44; G02B 6/441; G02B 6/443; G02B 6/4432; G02B 6/4434; G02B 6/4413; G02B 6/4457; G02B 6/4494
USPC .................................................. 385/100–113
See application file for complete search history.

(56) References Cited

U.S. PATENT DOCUMENTS

| 4,756,600 A | * | 7/1988 | Ramsay | G02B 6/443 385/102 |
|---|---|---|---|---|
| 8,913,862 B1 | | 12/2014 | Emmerich | |
| 2005/0196113 A1 | * | 9/2005 | Hurley | G02B 6/441 385/109 |
| 2011/0293228 A1 | * | 12/2011 | Keller | G02B 6/4486 385/103 |
| 2012/0213483 A1 | | 8/2012 | Risch | |

FOREIGN PATENT DOCUMENTS

EP    1550890 A1    7/2005

* cited by examiner

*Primary Examiner* — Michael P Mooney
(74) *Attorney, Agent, or Firm* — Dority & Manning, P.A.

(57) ABSTRACT

A tactical deployable cable is provided. The cable includes a fiber optic unit. The fiber optic unit includes a plurality of optical fibers, each of the plurality of optical fibers having a maximum nominal outer diameter of less than or equal to about 250 microns. The fiber optic unit further includes a UV cured resin layer surrounding and encapsulating the plurality of optical fibers. The fiber optic unit further includes a thermoplastic elastomer buffer layer surrounding the UV cured resin layer. The cable may include a thermoplastic jacket surrounding the fiber optic unit, and a plurality of strength members disposed between the jacket and the fiber optic unit.

22 Claims, 3 Drawing Sheets

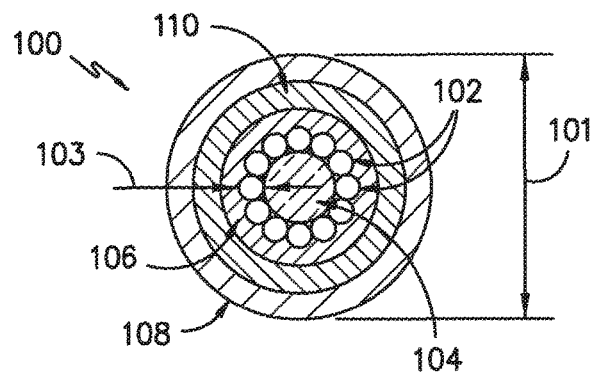
FIG. -1-
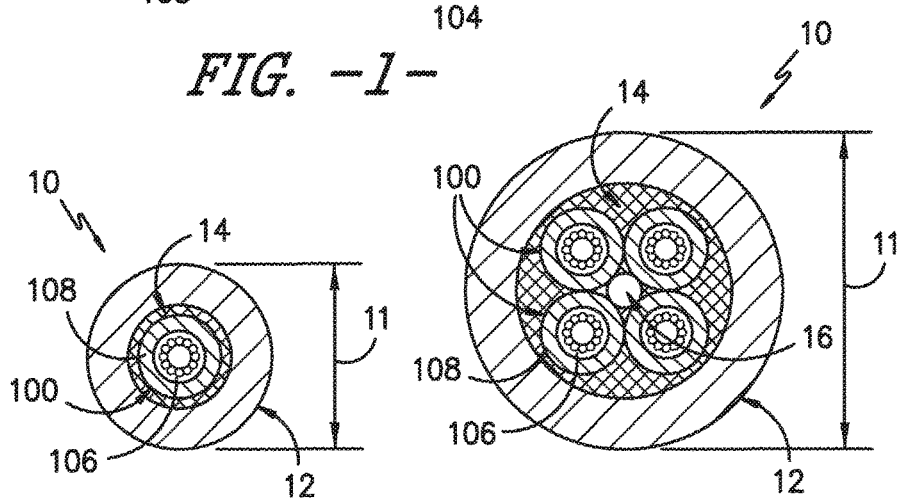
FIG. -2-  FIG. -3-
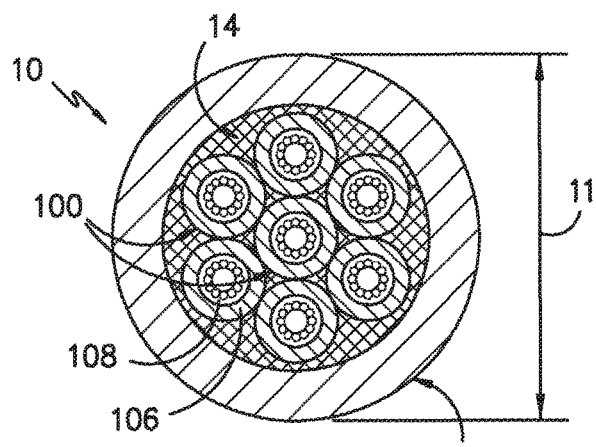
FIG. -4-

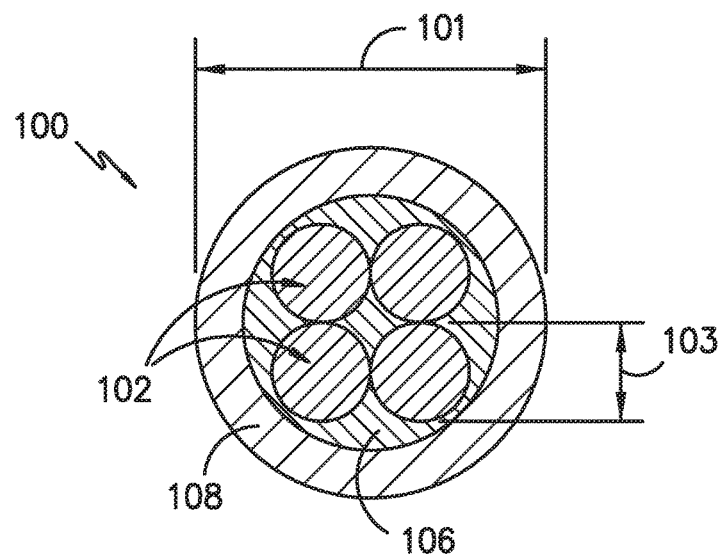
FIG. -5-
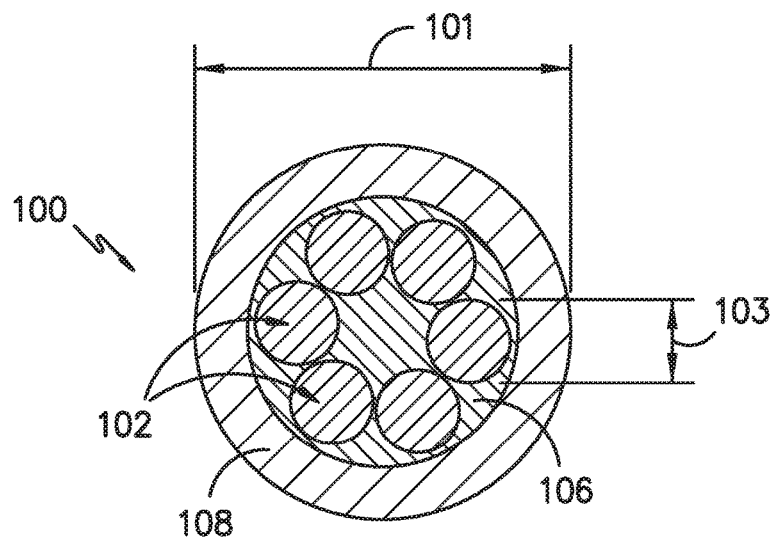
FIG. -6-

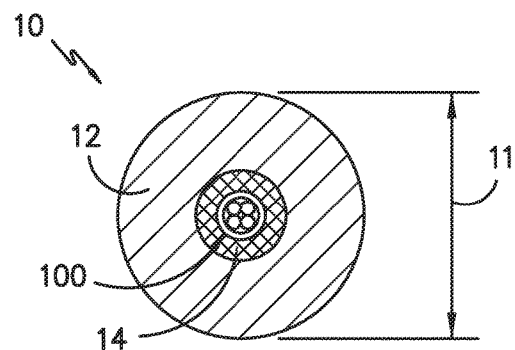
FIG. -7-
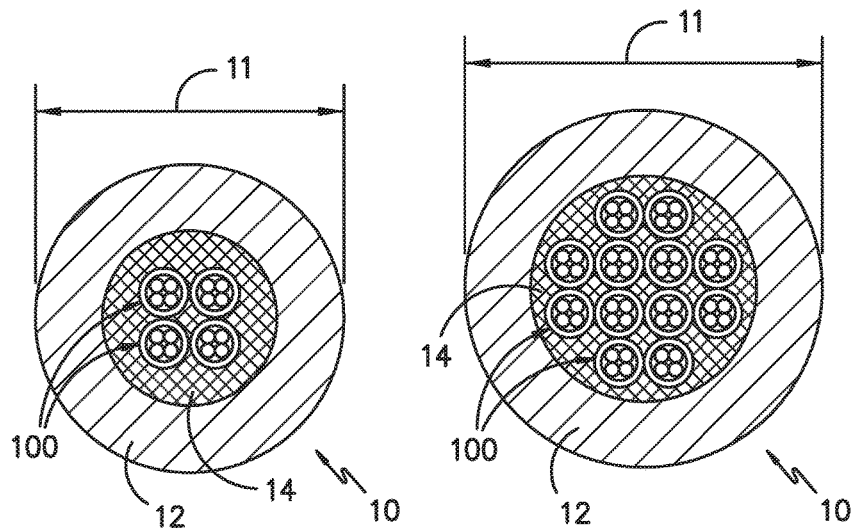
FIG. -8-  FIG. -9-

TACTICAL DEPLOYABLE CABLES

PRIORITY STATEMENT

This application is a National Stage Application of PCT/US2016/051000, filed on Sep. 9, 2016, which claims the benefit of priority to U.S. Provisional Application No. 62/217,400, filed on Sep. 11, 2015, the disclosures of all of which are incorporated by reference herein in their entireties.

FIELD OF THE INVENTION

The present disclosure relates generally to tactical deployable cables which utilize optical fibers, and more specifically to high fiber count, reduced diameter, reduced weight, and mechanically robust tactical deployable cables.

BACKGROUND OF THE INVENTION

Modern day broadcast technology consists of mobile equipment driven to field locations whereby events are broadcast live over HD and UHD video formats. As more and more consumers of video content look to mobile devices as a source of such broadcasts the market for providing such content is growing. Content producers and franchises owners of sports teams, news channels, and other programming packages are drawing more and more demand to broadcast in HD and UHD formats. This in turn is driving growth in demand for mobile equipment capable of being mobilized and deployed in a customized vehicle.

Over the last few years, optical cables have been used in such broadcast scenarios. The deployable style cables are connected to the mixing equipment in the vehicle and then deployed along behind a cameraman. The cables must be highly flexible and free of coiling memory so that they can pay off the reel in an uninhibited manner. The cables must be small and lightweight so as to maximize the amount of cable that can be placed on a small reel system that can be carried by a person. Additionally, the cables must be mechanically robust and abrasion resistant to withstand crushing forces, impact forces, and tensile loads during deployment and operation. They must also be weather resistant and water resistant to hold up under extreme conditions.

Traditional designs have utilized 900 micron buffered fibers helically stranded and strengthened with aramid yarns. An outer jacket of thermoplastic polyurethane is commonly pressure extruded over the core to provide a very tight cross section that minimizes or eliminates differential movement between the fibers and outer jacket. While these constructions are effective, minimum cable size is limited by the geometry of the core with the 900 micron buffered fibers.

Accordingly, improved deployable-style cables are desired in the art. In particular, tactical deployable cables which have reduced diameters and weights relative to known deployable-style cables while maintaining sufficiently robust characteristics for use in extreme conditions would be advantageous.

BRIEF DESCRIPTION OF THE INVENTION

Aspects and advantages of the invention will be set forth in part in the following description, or may be obvious from the description, or may be learned through practice of the invention.

The present disclosure generally provides reduced diameter, reduced weight tactical deployable cables. Advantageously, such cables utilize fiber optic units which include optical fibers having maximum nominal outer diameters of less than or equal to about 250 microns, such as between 200 and 250 microns. In exemplary embodiments, the reduced diameter, reduced weight deployable cables in accordance with the present disclosure are capable of meeting or exceeding the performance requirements of ICEA S-104-696, MIL-PRG-85045, and Def Stan 60. Cables in accordance with the present disclosure provide several key benefits. Without sacrificing performance characteristics, the number of optical fibers within the cable increases dramatically while the cable diameter is reduced and the cable weight is reduced. These reductions significantly increase the amount of cable that can be placed on a small reel system and that can be carried by a person, thereby increasing the deployment length and minimizing the number of field connections. Additionally, the fiber optic unit enables mass fiber termination in a deployable cable.

In accordance with one embodiment, a tactical deployable cable is provided. The cable includes a fiber optic unit. The fiber optic unit includes a plurality of optical fibers, each of the plurality of optical fibers having a maximum nominal outer diameter of less than or equal to about 250 microns. The fiber optic unit further includes a UV cured resin layer surrounding and encapsulating the plurality of optical fibers. The fiber optic unit further includes a thermoplastic elastomer buffer layer surrounding and in contact with the UV cured resin layer. The fiber optic unit has a maximum outer diameter of less than or equal to 1000 microns.

In accordance with another embodiment, a tactical deployable cable is provided. The cable includes a fiber optic unit. The fiber optic unit includes a plurality of optical fibers, each of the plurality of optical fibers having a maximum nominal outer diameter of less than or equal to about 250 microns. The fiber optic unit further includes a UV cured resin layer surrounding and encapsulating the plurality of optical fibers, and a thermoplastic elastomer buffer layer surrounding and the UV cured resin layer.

In exemplary embodiments, a cable in accordance with the present disclosure further includes a thermoplastic jacket surrounding the fiber optic unit, and a plurality of strength members disposed between the jacket and the fiber optic unit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional view of a fiber optic unit of a tactical deployable cable in accordance with embodiments of the present disclosure;

FIG. 2 is a cross-sectional view of a tactical deployable cable with one fiber optic unit in accordance with embodiments of the present disclosure;

FIG. 3 is a cross-sectional view of a tactical deployable cable with four fiber optic units in accordance with embodiments of the present disclosure;

FIG. 4 is a cross-sectional view of a tactical deployable cable with seven fiber optic units in accordance with embodiments of the present disclosure;

FIG. 5 is a cross-sectional view of a fiber optic unit of a tactical deployable cable in accordance with embodiments of the present disclosure;

FIG. 6 is a cross-sectional view of a fiber optic unit of a tactical deployable cable in accordance with embodiments of the present disclosure;

FIG. 7 is a cross-sectional view of a tactical deployable cable with one fiber optic unit in accordance with embodiments of the present disclosure;

FIG. 8 is a cross-sectional view of a tactical deployable cable with four fiber optic units in accordance with embodiments of the present disclosure; and FIG. 9 is a cross-sectional view of a tactical deployable cable with twelve fiber optic units in accordance with embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 9, various embodiments of tactical deployable cables 10 and fiber optic units 100 thereof are provided. As discussed, cables 10 in accordance with the present disclosure have reduced diameters and weights relative to known deployable-style cables, while maintaining sufficiently robust characteristics for use in extreme conditions.

A cable 10 in accordance with the present disclosure may include one or more fiber optic units 100. Each fiber optic unit 100 may include a plurality of optical fibers 102. Each optical fiber 102 in accordance with the present disclosure may have a maximum nominal (i.e. plus or minus 7 microns) outer diameter 103 of less than or equal to 250 microns, such as between 200 and 250 microns. For example, in some embodiments as illustrated in FIGS. 1 and 5, each optical fiber 102 may have a maximum nominal outer diameter 103 of 250 microns. In other embodiments as illustrated in FIG. 6, each optical fiber 102 may have a maximum nominal outer diameter 103 of 200 microns. Typically, all optical fibers 102 in a unit 100 may have the same maximum nominal outer diameter 103.

In exemplary embodiments, a unit 100 may include less than or equal to 12 optical fibers 102. For example, FIG. 1 illustrates a unit 100 having 12 optical fibers 102. FIG. 5 illustrates a unit 100 having 4 optical fibers 102. FIG. 6 illustrates a unit 100 having 6 optical fibers 102. The use of optical fibers 102 having maximum nominal outer diameters 103 of less than or equal to 250 microns allows for the fiber optic units 100 to have relative reduced diameters, thus allowing for the cables 10 to have relatively reduced diameters. Notably, in exemplary embodiments such as those illustrated in FIGS. 5 and 6, the unit 100 may have a maximum outer diameter 101 of less than or equal to 1000 microns, such as less than or equal to 950 microns, such as less than or equal to 920 microns, such as less than or equal to 910 microns, such as 900 microns. Accordingly, cables 10 in accordance with the present disclosure can advantageously utilize units 100 having multiple optical fibers 102 in the place of previously utilized 900 micron maximum outer diameter optical fibers.

In exemplary embodiments, the optical fibers 102 in each unit 100 may be helically stranded together. In some embodiments, such as illustrated in FIG. 1, a central strength member or rod 104 may be provided in the unit 100, and the optical fibers 102 may surround (and in exemplary embodiments contact) the central rod 104. For example, the optical fibers 102 may be helically stranded about the rod 104. When utilized, rod 104 may for example be formed from a fiber reinforced plastic material, such as an aramid or other fiber (such as glass or carbon) reinforced plastic material. In alternative exemplary embodiments as illustrated in FIGS. 5 and 6, however, no central rod 104 may be utilized.

A resin layer 106, such as a first resin layer 106, may surround and encapsulate the plurality of optical fibers 102 in each unit 100 (as well as the optional rod 104). Optical fibers 102 may thus be embedded in the resin layer 106. The resin of layer 106 may be an ultraviolet light ("UV) cured resin layer, such as in exemplary embodiments a silicone or acrylate. In exemplary embodiments, the resin layer 106 may have a tensile modulus of less than 10 MPa. Such low modulus resin may advantageously serve to provide protection for each optical fiber 102 by limiting exposure to micro-bends and macro-bends.

A buffer layer 108 may surround the resin layer 106. In exemplary embodiments, the buffer layer 108 may be the outermost layer of the unit 100, thus defining an exterior surface and maximum outer diameter 101 of the unit 100. In exemplary embodiments, the buffer layer 108 is formed from a thermoplastic, such as a thermoplastic elastomer. The buffer layer 108 may serve to protect the unit 100 from external forces, and may additionally facilitate identification of the unit 100.

In some embodiments, as illustrated in FIGS. 2 through 9, the buffer layer 108 may be in contact with the resin layer 106. In other embodiments, as illustrated in FIG. 1, a second resin layer 110 may be provided. The second resin layer 110 may be disposed between and in contact with the first resin layer 106 and the buffer layer 108. The resin of layer 110 may be an ultraviolet light ("UV) cured resin layer, such as in exemplary embodiments a silicone or acrylate. In exemplary embodiments, the resin of layer 110 may be different from the resin of layer 106. Further, in exemplary embodiments, the resin layer 106 may have a secant modulus of greater than 500 MPa. Such high modulus resin may serve to isolate the optical fibers 102 from external forces including lateral and compressive forces that can cause attenuation losses in the light signal.

One or more fiber optic units 100 may be utilized in each cable 10. Advantageously the maximum outer diameter 11 and weight of a cable 10 in accordance with the present disclosure may be reduced relative to known deployable-style cables, due to the characteristics of the units 100 as discussed herein. Each cable 10 may include one or more fiber optic units 100. Further, each cable 10 may include a jacket 12, such as a thermoplastic jacket 12, that surrounds the unit(s) 100. In exemplary embodiments, the thermoplastic jacket 12 may be formed from a polyurethane. In exemplary embodiments, the thermoplastic jacket 12 may be the outermost layer of the cable 10, thus defining an exterior surface and maximum outer diameter 11 of the cable 10.

Additionally, a plurality of strength members 14 may be provided in cable 10. The strength members 14 may be disposed between the jacket 12 and the fiber optic units 100, and may for example at least partially surround one or more units 100. In exemplary embodiments, the strength members 14 may be aramid yarns.

In exemplary embodiments when multiple units 100 are utilized, the units 100 in each cable 10 may be helically stranded together. In some embodiments, such as illustrated in FIG. 3, a central strength member or rod 16 may be provided in the cable 10, and the units 100 may surround (and in exemplary embodiments contact) the rod 16. For example, the units 100 may be helically stranded about the rod 16. When utilized, rod 16 may for example be formed from a fiber reinforced plastic material, such as an aramid or other fiber (such as glass or carbon) reinforced plastic material. In alternative exemplary embodiments as illustrated in FIGS. 2, 4, and 7 through 9, however, no central rod 16 may be utilized.

Any suitable number of units 100 may be utilized in a cable 10. For example, FIGS. 2 and 7 illustrate a cable 10 having one fiber optic unit 100. In some such exemplary embodiments, the cable 10 may have a maximum outer diameter 11 of less than 4.5 millimeters, such as less than 4.2 millimeters, such as 4 millimeters. FIGS. 3 and 8 illustrate a cable 10 having four fiber optic units 100. In some such exemplary embodiments, the cable 10 may have a maximum outer diameter 11 of less than 5.6 millimeters, such as 5.5 millimeters. FIG. 4 illustrates a cable 10 having seven fiber optic units 100 in a "6+1" orientation, with six units 100 surrounding a central seventh unit 100. FIG. 9 illustrates a cable 10 having twelve fiber optic units 100. In some such exemplary embodiments, the cable 10 may have a maximum outer diameter 11 of less than 6.5 millimeters, such as 6.4 millimeters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tactical deployable cable, comprising:
   a fiber optic unit, the fiber optic unit comprising:
      a plurality of optical fibers, each of the plurality of optical fibers having a maximum nominal outer diameter of less than or equal to about 250 microns;
      a UV cured resin layer surrounding and encapsulating the plurality of optical fibers; and
      a thermoplastic elastomer buffer layer surrounding and in contact with the UV cured resin layer,
      wherein the fiber optic unit has a maximum outer diameter of less than or equal to 1000 microns.

2. The cable of claim 1, wherein the plurality of optical fibers consists of four optical fibers.

3. The cable of claim 2, wherein each of the four optical fibers has a maximum nominal outer diameter of about 250 microns.

4. The cable of claim 1, wherein the plurality of optical fibers consists of six optical fibers.

5. The cable of claim 4, wherein each of the six optical fibers has a maximum nominal outer diameter of about 200 microns.

6. The cable of claim 1, wherein the UV cured resin layer comprises a silicone.

7. The cable of claim 1, wherein the UV cured resin layer has a tensile modulus of less than 10 MPa.

8. The cable of claim 1, wherein the plurality of optical fibers are helically stranded.

9. The cable of claim 1, further comprising a thermoplastic jacket surrounding the fiber optic unit and a plurality of strength members disposed between the jacket and the fiber optic unit.

10. The cable of claim 9, wherein the strength members are aramid yarns.

11. The cable of claim 9, wherein the thermoplastic jacket comprises a polyurethane.

12. The cable of claim 1, wherein the fiber optic unit is a plurality of fiber optic units.

13. The cable of claim 12, wherein the plurality of fiber optic units consists of twelve fiber optic units and the cable has a maximum outer diameter of less than 6.5 millimeters.

14. The cable of claim 12, wherein the plurality of fiber optic units consists of four fiber optic units and the cable has a maximum outer diameter of less than 5.6 millimeters.

15. The cable of claim 12, wherein the plurality of fiber optic units consists of one fiber optic unit and the cable has a maximum outer diameter of less than 4.5 millimeters.

16. A tactical deployable cable, comprising:
    a fiber optic unit, the fiber optic unit comprising:
       a plurality of optical fibers, each of the plurality of optical fibers having a maximum nominal outer diameter of less than or equal to about 250 microns;
       a UV cured resin layer surrounding and encapsulating the plurality of optical fibers; and
       a thermoplastic elastomer buffer layer surrounding the UV cured resin layer;
    a thermoplastic polyurethane jacket surrounding the fiber optic unit; and
    a plurality of strength members disposed between the jacket and the fiber optic unit.

17. The cable of claim 16, wherein the UV cured resin layer comprises a silicone.

18. The cable of claim 16, wherein the UV cured resin layer has a tensile modulus of less than 10 MPa.

19. The cable of claim 16 wherein the buffer layer contacts the LTV cured resin layer.

20. The cable of claim 16, wherein the UV cured resin layer is a first UV cured resin layer, and further comprising a second UV cured resin layer disposed between and in contact with the first UV cured resin layer and the thermoplastic elastomer buffer layer, the second UV cured resin layer having a secant modulus of greater than 500 MPa.

21. The cable of claim 16, wherein the fiber optic unit further comprising a central rod, the optical fibers surrounding the central rod.

22. The cable of claim 16, wherein the fiber optic unit has a maximum outer diameter of less than or equal to 1000 microns.

* * * * *